United States Patent
Raitola

(10) Patent No.: US 11,068,792 B2
(45) Date of Patent: Jul. 20, 2021

(54) METHOD AND APPARATUS FOR PREDICTING FLOOR INFORMATION FOR A DESTINATION CALL

(71) Applicant: KONE Corporation, Helsinki (FI)

(72) Inventor: Pasi Raitola, Helsinki (FI)

(73) Assignee: KONE Corporation, Helsinki (FI)

( * ) Notice: Subject to any disclaimer, the term of this patent is extended or adjusted under 35 U.S.C. 154(b) by 946 days.

(21) Appl. No.: 15/639,730

(22) Filed: Jun. 30, 2017

(65) Prior Publication Data

US 2017/0300820 A1 Oct. 19, 2017

Related U.S. Application Data

(63) Continuation of application No. PCT/FI2015/050105, filed on Feb. 24, 2015.

(51) Int. Cl.
G06N 5/04 (2006.01)
B66B 1/46 (2006.01)
B66B 1/34 (2006.01)

(52) U.S. Cl.
CPC ............. *G06N 5/04* (2013.01); *B66B 1/3461* (2013.01); *B66B 1/468* (2013.01); *B66B 2201/4615* (2013.01); *B66B 2201/4653* (2013.01)

(58) Field of Classification Search
CPC ............ B66B 1/2408; B66B 2201/463; B66B 1/3461; B66B 1/3492; B66B 1/468; B66B 2201/4615; B66B 2201/4653; B66B 21/00; B66B 2201/4638; G06N 5/04
See application file for complete search history.

(56) References Cited

U.S. PATENT DOCUMENTS

| | | | |
|---|---|---|---|
| 5,276,295 A | 1/1994 | Kameli | |
| 5,841,084 A * | 11/1998 | Thangavelu | B66B 1/2458 187/382 |
| 5,949,037 A | 9/1999 | Oya | |
| 6,619,436 B1 * | 9/2003 | Hikita | B66B 1/2458 187/382 |
| 8,151,943 B2 * | 4/2012 | de Groot | B66B 1/2458 187/382 |

(Continued)

FOREIGN PATENT DOCUMENTS

EP 0 565 864 A1 10/1993
EP 2 604 562 A2 6/2013
(Continued)

OTHER PUBLICATIONS

Extended European Search Report issued in related EP Application No. 15883052.1 dated Nov. 21, 2018.

*Primary Examiner* — Jean A Gelin
(74) *Attorney, Agent, or Firm* — Birch, Stewart, Kolasch & Birch, LLP

(57) ABSTRACT

According to one aspect, there is provided a method for predicting floor information for a destination call. The method comprises storing, in a memory, destination call history entries about destination calls made by a user, each destination call history entry comprising a time stamp and a source and destination floor pair for a destination call; detecting an intention of the user to make a new destination call; and predicting a destination floor for the new destination call based on the current time and the stored destination call history entries of the user.

16 Claims, 4 Drawing Sheets

(56) References Cited

U.S. PATENT DOCUMENTS

| | | | | |
|---|---|---|---|---|
| 8,172,044 B2* | 5/2012 | Tokura | ............... | B66B 1/2458 |
| | | | | 187/387 |
| 8,499,895 B2* | 8/2013 | Zweig | ................ | B66B 1/468 |
| | | | | 187/387 |
| 9,589,082 B2* | 3/2017 | Ide | ................ | G01C 21/3617 |
| 10,308,477 B2* | 6/2019 | Patel | ................ | B66B 1/3476 |
| 2012/0031709 A1 | 2/2012 | Finschi | | |
| 2016/0031676 A1* | 2/2016 | Haipus | ............... | B66B 1/3415 |
| | | | | 187/247 |
| 2017/0050820 A1* | 2/2017 | Kondo | ............... | B66B 5/0093 |

FOREIGN PATENT DOCUMENTS

| | | |
|---|---|---|
| WO | WO 2014/049201 A1 | 4/2014 |
| WO | WO 2015/015049 A1 | 2/2015 |

\* cited by examiner

METHOD AND APPARATUS FOR PREDICTING FLOOR INFORMATION FOR A DESTINATION CALL

CROSS REFERENCE TO RELATED APPLICATIONS

This application is a Continuation of PCT International Application No. PCT/FI2015/050105, filed on Feb. 24, 2015, the entire content of which is herein expressly incorporated by reference into the present application.

BACKGROUND

In elevator systems of high buildings there may be various ways to give a destination call. When a destination call is given, a passenger gives the destination floor to which he is heading to the elevator system. The destination call may be given via a destination call panel arranged to each floor near the elevators. Another possibility is to use, for example, a destination call application running in a mobile device, for example, in a mobile phone. When giving a destination call, for example, using the destination call application, a user of the mobile device provides a source floor and a destination floor to the elevator system, and the elevator system allocates an elevator car for the destination call.

SUMMARY

According to a first aspect of the invention, there is a method for predicting floor information for a destination call. The method comprises storing, in a memory, destination call history entries about destination calls made by a user, each destination call history entry comprising a time stamp and a source and destination floor pair for a destination call; detecting an intention of the user to make a new destination call; and predicting a destination floor for the new destination call based on the current time and the stored destination call history entries of the user.

In one embodiment, the method comprises predicting a source floor for the new destination call based on the current time and the stored destination call history entries.

In one embodiment, alternatively or in addition, the method comprises dividing time of day to a plurality of time slots, and associating each destination call history entry with a time slot corresponding to the time stamp of the destination call.

In one embodiment, alternatively or in addition, predicting the destination floor for the new destination call comprises determining the time slot corresponding to the current time, and determining which source and destination floor pairs are associated in the destination call history entries multiple times for the determined time slot.

In one embodiment, alternatively or in addition, the method comprises selecting a destination floor from the source and destination floor pairs associated in the destination call history entries multiple times for the determined time slot as the predicted destination floor.

In one embodiment, alternatively or in addition, the method comprises selecting the destination floor having the highest occurrence number in the determined time slot.

In one embodiment, alternatively or in addition, the method comprises selecting a source and destination floor pair from the source and destination floor pairs associated in the destination call history entries multiple times for the determined time slot as the predicted source and destination floor.

In one embodiment, alternatively or in addition, the method comprises selecting the source and destination floor pair having the highest occurrence number in the determined time slot.

In one embodiment, alternatively or in addition, the method comprises detecting with a mobile device the source floor in response to detecting an intention to make a new destination call, and using the detected source floor as the predicted source floor.

In one embodiment, alternatively or in addition, detecting an intention to make a new destination call comprises receiving, from a mobile device, a message indicating the intention to make the new destination call with the mobile device; and wherein the method further comprises causing transmission of the predicted destination floor or the predicted source floor and the destination floor to the mobile device.

According to a second aspect of the invention, there is an apparatus for predicting floor information for a destination call. The apparatus comprises a memory, means for storing destination call history entries about destination calls made by a user to the memory, each destination call history entry comprising a time stamp and a source and destination floor pair for a destination call; means for detecting an intention of the user to make a new destination call; and means for predicting a destination floor for the new destination call based on the current time and the stored destination call history entries of the user.

In one embodiment, the apparatus comprises means for predicting a source floor for the new destination call based on the current time and the stored destination call history entries.

In one embodiment, alternatively or in addition, the apparatus comprises means for dividing time of day to a plurality of time slots, and means for associating each destination call history entry with a time slot corresponding to the time stamp of the destination call.

In one embodiment, alternatively or in addition, the means for predicting the destination floor for the new destination call are configured to determine the time slot corresponding to the current time, and determine which source and destination floor pairs are associated in the destination call history entries multiple times for the determined time slot.

In one embodiment, alternatively or in addition, the apparatus comprises means for selecting a destination floor from the source and destination floor pairs associated in the destination call history entries multiple times for the determined time slot as the predicted destination floor.

In one embodiment, alternatively or in addition, the means for selecting are configured to select the destination floor having the highest occurrence number in the determined time slot.

In one embodiment, alternatively or in addition, the apparatus comprises means for selecting a source and destination floor pair from source and destination floor pairs associated in the destination call history entries multiple times for the determined time slot as the predicted source and destination floor.

In one embodiment, alternatively or in addition, the means for selecting are configured to select the source and destination floor pair having the highest occurrence number in the determined time slot.

In one embodiment, alternatively or in addition, the apparatus comprises means for detecting the source floor in response to detecting an intention to make a new destination call, and means for using the detected source floor as the predicted source floor.

In one embodiment, alternatively or in addition, the means for detecting are configured to receive, from a mobile device, a message indicating the intention to make the new destination call with the mobile device; and wherein the apparatus further comprises means for causing transmission of the predicted destination floor or the predicted source floor and the destination floor to the mobile device.

According to a third aspect of the invention, there is provided a computer program comprising program code, which when executed by a processor, performs the method of the first aspect.

In one embodiment, the computer program is embodied on a computer-readable medium.

According to a fourth aspect of the invention, there is provided an apparatus for predicting floor information for a destination call. The apparatus comprises at least one processor, and at least one memory storing program instructions that, when executed by the at least one processor, cause the apparatus to store destination call history entries about destination calls made by a user, each destination call history entry comprising a time stamp and a source and destination floor pair for a destination call; detect an intention of the user to make a new destination call; and predict a destination floor for the new destination call based on the current time and the stored destination call history entries of the user.

The means described above may be implemented using at least one processor, or at least one processor and at least one memory storing program instructions.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Normally, when a user gives a destination call in an elevator system, the user inputs the destination floor to the elevator system using, for example, a destination operating panel. The examples below describe examples how to predict a destination or a destination and a source floor when a user is about to make a new destination call in the elevator system. The elevator system may comprise any number of elevator cars.

FIGS. 1A, 1B, 2A, 2B, 3A and 3B will be described together below.

Figure 1A:
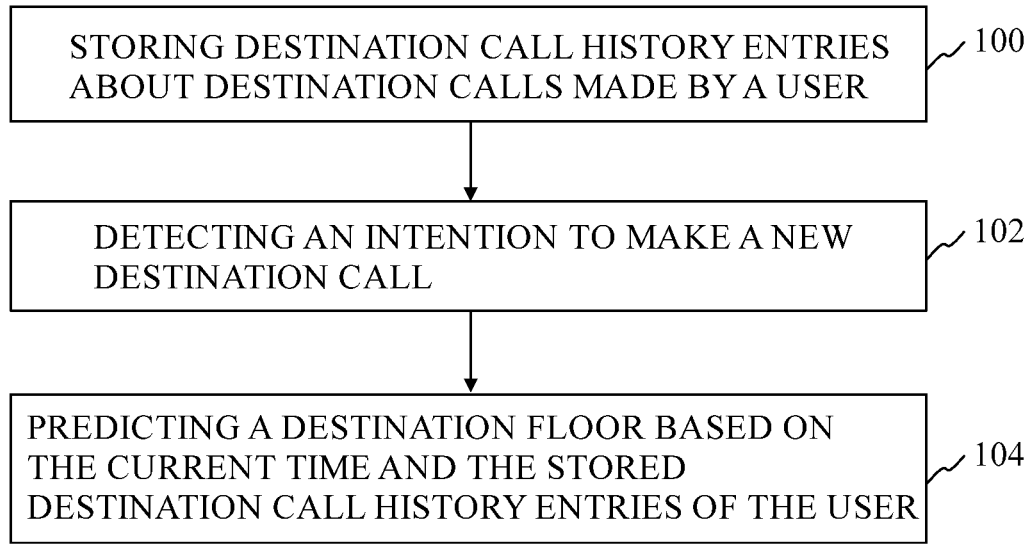
FIG. 1A is a flow diagram illustrating a method of predicting a destination floor.

FIG. 1A is a flow diagram illustrating a method of predicting floor information for a destination call. At 100, destination call history entries about destination calls made by a user in an elevator system are stored in a memory. Each destination call history entry comprises a time stamp and a source and destination floor pair for a destination call. Each destination call history entry may also identify a user or a mobile device that made the destination call. The memory may be arranged in the user's mobile device with which the destination calls are made. In another example, the memory may reside outside the mobile device, for example, in the elevator system or in a network element that can be accessed, for example, via the internet.

Figure 2A:
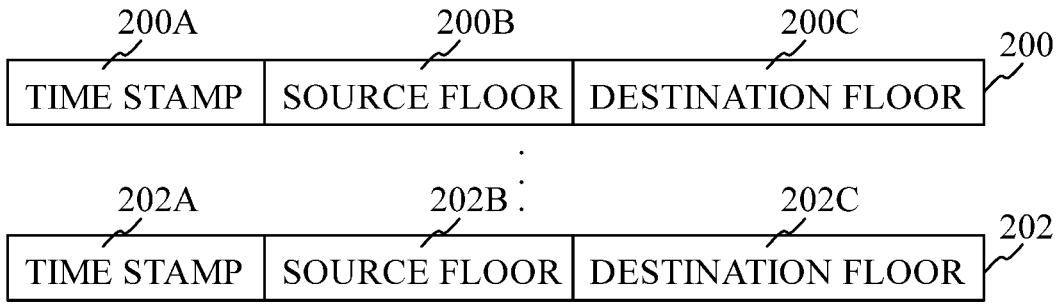
FIG. 2A illustrates one example of a destination call history entry.

FIG. 2A illustrates an example of a possible destination call history entry. FIG. 2A discloses two entries 200, 202. Each entry relates to a previously made destination call and records a time stamp 200A, 202A indicating when the destination call was made. Each entry 200, 202 also records a source floor 200B, 202B and a destination floor 200C, 202C for the destination call. The time stamp 200A, 202A may indicate a global time, in other words, the actual time moment and date (for example 30.10.2014 16:30). In another example, the time stamp 200A, 202A may be weekly based. In other words, the time stamp 200A, 202A may indicate only the weekday and time of the day when the destination call was made.

Figure 2B:
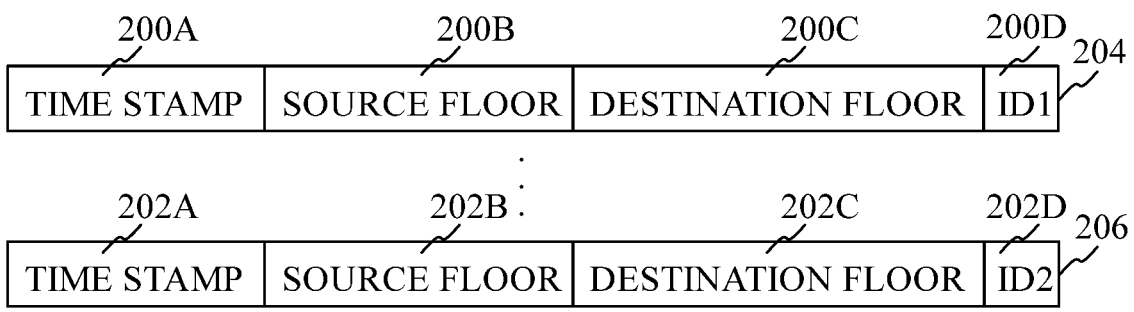
FIG. 2B illustrates another example of a destination call history entry.

FIG. 2B discloses another example of a destination call history entry 204, 206. Entries 204, 206 differ from the entries 200, 202 of FIG. 2A in that there is an additional field 200D, 202D in the entries 204, 206. Fields 200D, 202D provide identifiers which identify the entries 204, 206. The identifier 200D, 202D may also identify the user, in other words, link a specific user to each entry. Alternatively, the identifier 200D, 202D may identify a mobile device used by the user, in other words, link a specific mobile device to each entry.

Referring back to FIG. 1A, at 102 it is detected that the user has an intention to make a new destination call. The intention is detected, for example, when the user launches a destination call application with his mobile device with which the user is able to initiate destination calls of an elevator system. The destination call application may refer to any application executable by the mobile device with which the user is able to place a destination call in the elevator system. In another example, the user may use, for example, a browser based interface to initiate destination calls. If the user uses a browser based interface, the mobile device is connected to the elevator system wirelessly via, for example, a wireless local area network (WLAN) or any other local wireless connection.

Normally the user would input source and destination floors to the destination call application or to the browser based interface in order to make the new destination call. As indicated at 104, at least the destination floor is predicted based on the current time and the stored destination call history entries of the user. In another example, both the source and destination floors are predicted and therefore the user need not manually input any floor information to the destination call application or via the browser based interface.

Figure 1B:
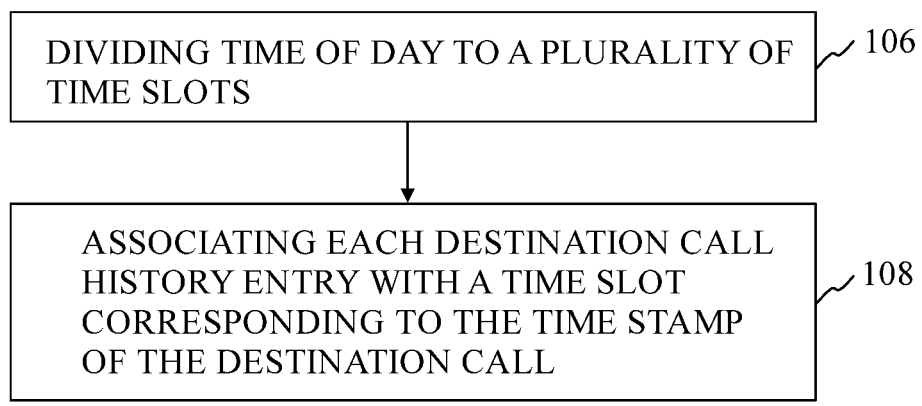
FIG. 1B is a flow diagram illustrating a method of associating a destination call history entry with a time slot.
Figure 3A:
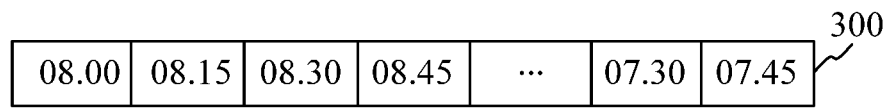
FIG. 3A illustrates the division of time of day to a plurality of slots.
Figure 3B:
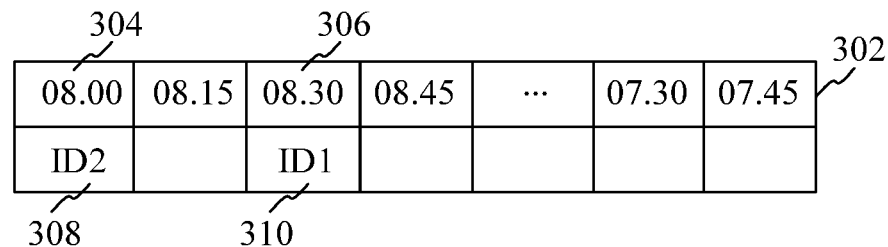
FIG. 3B illustrates the assignment of destination call history entries to a plurality of slots.

As to one possible way of enabling the prediction of the destination or source and destination floors, FIGS. 1B, 3A and 3B are discussed.

FIG. 1B illustrates a flow diagram of a method of associating a destination call history entry with a time slot. At 106, a day is divided into a plurality of time slots. FIGS. 3A and 3B provide examples of dividing time of day into a plurality of time slots. Although FIG. 3A illustrates that only one day is divided into time slots 300, it is possible to make similar division separately for each weekday (Mon, Tue, . . ., Sun). Although FIGS. 3A and 3B disclose that one time slot is 15 minutes, the length of the time slot may be any other length. In a further example, the length of the time slots may vary depending on the time of the day. For example, during night the time slot may be one hour long and on weekdays during peak hours only 10 minutes long.

At 108 each destination call history entry is associated with a time slot corresponding to the time stamp of a destination call history entry. As indicated in FIG. 3B, an identifier 308, 310 may be linked to a time slot 304, 306 of a plurality of time slots 302. Based on the linking it is possible to determine which source and destination floor pairs relate to which time slot. When the identifier 308 is associated with the time slot 304, it means that the user has made a destination call from the source floor 202B to the destination floor 202C during the time period associated with the time slot 304.

Figure 4:
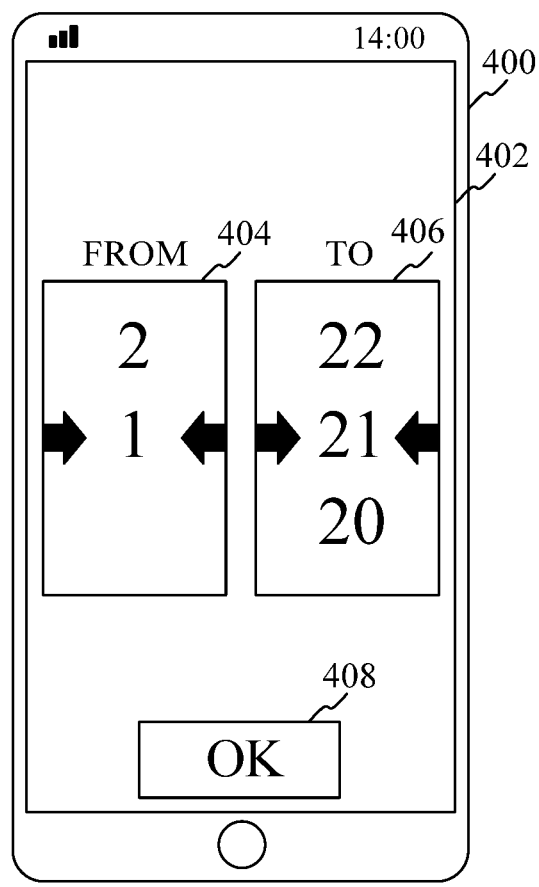
FIG. 4 illustrates an example of an application view on a display of an apparatus.

FIG. 4 illustrates an example of a destination call application view 402 on a display of an apparatus 400, for example, a mobile device. A "FROM" field 404 includes a source floor and a "TO" field 406 includes a destination floor for a new destination call to be placed. After the user is satisfied with the source and destination floors, a new destination call may be sent to an elevator system by the user selecting a button "OK" 408. The apparatus 400 may be wirelessly connected to the elevator system. The destination call application running in the apparatus 400 may be configured to store destination call history entries about destination calls made with the destination call application by the user. Each destination call history entry comprises at least a time stamp and a source and destination floor pair for a made destination call. As disclosed in FIGS. 3A and 3B and their corresponding description, the destination call application may use time slots to associate each already made destination call with a time slot. When the user is about to make a new destination call (indicated by, for example, when the user opens the destination call application), the time at that moment associates to one time slot.

In one example of FIG. 4, only the destination floor is predicted for the new destination call. The user inputs the source floor into the destination call application. The destination floor may be predicted before or after the user input. If the destination floor is predicted before the user inputs the source floor, the destination floor may be selected from the source and destination floor pairs associated in the destination call history entries multiple times with the determined time slot. In other words, this means in practice that the user has previously travelled multiple times to this destination floor during the time slot. In one example, the destination floor having the highest occurrence number in the determined time slot may be selected as the predicted destination floor, and is shown as a preselected destination floor in the destination call application view 402.

If the destination floor is predicted after the user has input the source floor, once the user has input the source floor the destination call history entries are analyzed in order to predict the destination floor. A time slot corresponding to the current time is first determined. The source and destination floor pairs associated with the time slot are then analyzed to find the source and destination floor pairs having the user input source floor as a source floor. The destination floor having the highest occurrence number with the input source floor may be selected as the predicted destination floor, and is shown as a preselected destination floor in the destination call application view 402.

In another example, both the source floor and destination floor may be predicted. The source and destination floors may be selected from the source and destination floor pairs associated in the destination call history entries multiple times with the determined time slot. In other words, this means that the user has previously travelled multiple times from the source floor to the destination floor during the time slot. In one example, the source and destination floor pair having the highest occurrence number in the determined time slot may be selected as the predicted source and destination floor pair, and they are shown as a preselected source and destination floors in the destination call application view 402.

In another example, the source floor is detected and the destination floor is predicted. The source floor is detected, for example, with the apparatus 400. The apparatus 400 may comprise a sensor or sensors with which it is possible to detect what is the user's current floor. Further, any detecting technique, based on, for example, wireless signals or any indoor positioning solution, may be used. In one example, the source floor detection is initiated when the user opens the destination call application. The detected floor is then used as a preselected source floor in the "FROM" field 404. Once the source floor has been detected, the destination call history entries are analyzed in order to predict the destination floor. A time slot corresponding to the current time is first determined. Source and destination floor pairs associated with the time slot are then analyzed to find source and destination floor pairs having the detected source floor as a source floor. The destination floor having the highest occurrence number with the detected source floor may be selected as the predicted destination floor, and is shown as a preselected destination floor in the "TO" field 406.

In the above examples relating to FIG. 4, if the source and/or destination floor were predicted or detected incorrectly, the user may adjust the floor(s) manually before selecting the "OK" button 408. If the source and/or destination floor were predicted or detected correctly, the user selects the "OK" button 408 to place the destination call.

When the destination call has been placed, the destination call application stores a new destination call history entry including at least a time stamp and a source and destination floor pair for the placed destination call.

Further, it is evident that the application view 402 disclosed in FIG. 4 is only one example implementation of the view on a display of the apparatus 400.

Figure 5:
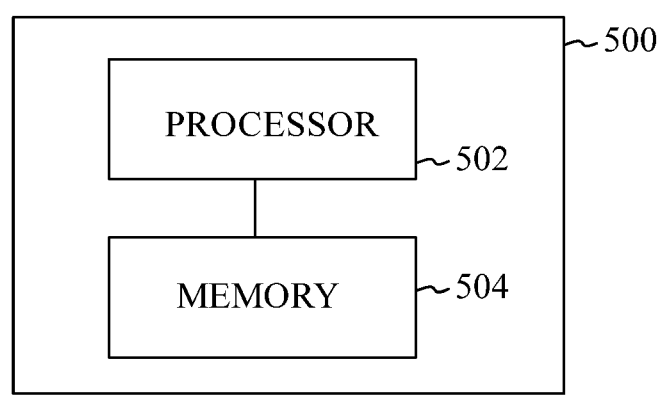
FIG. 5 is a block diagram of one example of an apparatus.

FIG. 5 is a block diagram illustrating an apparatus 500 in accordance with one embodiment of the invention. The apparatus 500 comprises at least one processor 502 connected to at least one memory 504. The at least one memory 504 may comprise at least one computer program which, when executed by the processor 502 or processors, causes the apparatus 500 to perform the programmed functionality. The apparatus 500 may also comprise a communication interface with which it is able to connect to an external device. The communication interface may comprise a wireless transceiver, for example, a wireless local area network (WLAN) transceiver and/or a transceiver enabling a connection to a mobile or other wireless communication network. The at least one memory 504 may comprise a destination call application described in FIG. 4. The memory 502 may store destination call history entries about destination calls made by a user, each destination call history entry comprising a time stamp and a source and destination floor pair for a destination call. The processor 502 is configured to detect an intention of the user to make a new destination call and to predict a destination floor for the new destination call based on the current time and the stored destination call history entries of the user.

Figure 6:
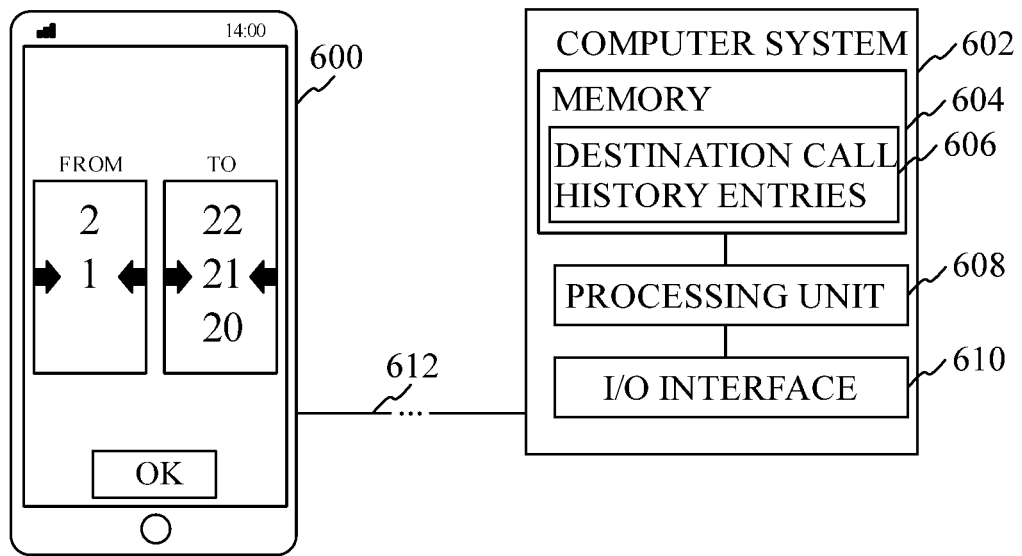
FIG. 6 illustrates an example in which a destination floor is predicted by a computer system and a mobile device is connected to the computer system.

FIG. 6 illustrates an example, where an external entity (a computer system 602) other than an apparatus 600 used by a user stores destination call history entries and performs the necessary processing in order to predict a source or a source and a destination floor. The computer system 600 refers, for example, to a control entity in an elevator system, to a back-end system in the elevator system, to a remote server accessible via a communication network, for example, the internet etc.

The apparatus 600, for example a mobile device or a mobile phone, executes an application which is connected to the computer system 602 via a data connection 612. The data connection 612 between the apparatus 600 and the computer system 602 may comprise a wireless connection, a wired connection, or both. For example, the apparatus 600 may have a local wireless connection to a wireless local area network (WLAN) via which the apparatus 600 may reach the computer system 602 via the internet. Alternatively, the apparatus 600 may be connected to the computer system 602 via a mobile communication network. Instead of the application, the interface provided by the apparatus 600 to the user may be provided by a browser application. In other words, the user uses the browser and a web page as an interface for placing destination calls. The application or the web page may provide the view disclosed in FIG. 6 or any other view that enables the user to initiate a new destination call.

The functions performed by the computer system 602 are similar to the functions performed by the apparatus 400 of FIG. 4. The difference is that computer system 602 receives from the apparatus 600 via an input/output interface 610 a message that indicates that a user intends to make a new destination call with the apparatus 600. The computer system 602 comprises a memory 604 storing destination call history entries 606 for the user. In other words, the memory 604 stores destination call history entries 606 about destination calls made by the user. Each destination call history entry comprises at least a time stamp and a source and destination floor pair for a made destination call.

As already discussed earlier with reference to FIGS. 3A and 3B each destination call history entry may be associated with a time slot corresponding to the time stamp of a destination call history entry. When the computer system 602 receives the message, it knows that the user is about to make a new destination call. The time at that moment associates to one time slot.

In one example of FIG. 6, the computer system 602 predicts only the destination floor for the new destination call. If the destination floor is predicted before the user inputs the source floor, the destination floor may be selected from the source and destination floor pairs associated in the destination call history entries 606 multiple times with the determined time slot. In other words, this means in practice that the user has previously travelled multiple times to this destination floor during the time slot. In one example, the destination floor having the highest occurrence number in the determined time slot may be selected as the predicted destination floor, and the computer system 602 sends the predicted destination floor to the apparatus 600 so that the apparatus 600 may show the destination floor as a preselected destination floor in the "TO" field.

If the destination floor is predicted after the user has input the source floor, once the user has input the source floor, the source floor information is sent to the computer system 602. The computer system 602 analyzes the destination call history entries 606 in order to predict the destination floor. A time slot corresponding to the current time is first determined. The source and destination floor pairs associated with the time slot are then analyzed to find the source and destination floor pairs having the user input source floor as a source floor. The destination floor having the highest occurrence number with the input source floor may be selected as the predicted destination floor. The computer system 602 then sends the predicted destination floor to the apparatus 600 so that the apparatus 600 may show the destination floor as a preselected destination floor in the "TO" field.

In another example, both the source floor and destination floor may be predicted by the computer system 602. The source and destination floors may be selected from the source and destination floor pairs associated in the destination call history entries 606 multiple times with the determined time slot. In other words, this means that the user has previously travelled multiple times from the source floor to the destination floor during the time slot. In one example, the source and destination floor pair having the highest occurrence number in the determined time slot may be selected as the predicted source and destination floor pair, and the computer system 602 sends the source and destination floors to the apparatus 600 so that the apparatus 600 may show the source and destination floors as a preselected floors in the "FROM" and "TO" fields.

In another example, the source floor is detected and the destination floor is predicted. The source floor is detected, for example, with the apparatus 600. The apparatus 600 may comprise a sensor or sensors with which it is possible to detect what is the user's current floor. Further, any detecting technique, based on, for example, wireless signals or any indoor positioning solution, may be used. In one example, the source floor detection is initiated when the user opens the destination call application or enters a web page via which the user is able to place a new destination call. The apparatus 600 sends the detected floor to the computer system 602. Once the source floor has been received by the computer system 602, the computer system 602 analyzes the destination call history entries 606 in order to predict the destination floor. A time slot corresponding to the current time is first determined. Source and destination floor pairs associated with the time slot are then analyzed to find source and destination floor pairs having the detected source floor as a source floor. The destination floor having the highest occurrence number with the detected source floor may be selected as the predicted destination floor, and computer system 602 sends the destination floor to the apparatus 600 so that the apparatus 600 may show the destination floor as a preselected destination floor in the "TO" field.

In the above examples relating to FIG. 6, if the source and/or destination floor were predicted or detected incorrectly, the user may adjust the floor(s) manually before selecting the "OK" button. Further, it is evident that the view disclosed in FIG. 6 is only one example implementation of the view on a display of the apparatus 600.

When the user is satisfied with the source and destination floors, he may place the destination call by selecting the "OK" button. After the destination call has been placed, the apparatus 600 itself or the elevator system receiving the destination call sends a time stamp and a source and destination floor pair for the placed destination call to the computer system 602.

The computer system 602 comprises a processing unit 608 (or multiple processing units) which controls the operations of the computer system 602. The memory 604 may store a computer program or programs comprising program code, which when executed by the processing unit 608, performs the programmed functionality discussed above.

In the example disclosed in FIG. 6, there is no need to install any special software in the mobile device since the processing relating to predicting the floor information is performed outside the mobile device and the mobile device uses only a browser based interface.

The examples disclosed above provide a solution where the user is able to make a new destination call faster since he does not have to manually input a destination floor or both a source floor and a destination floor. Further, the amount of incorrect destination calls (for example, to incorrect destination floors input by the user) is reduced since the solution described above in the various examples reduces the amount of manual floor selections made by the user.

Figure 7A:
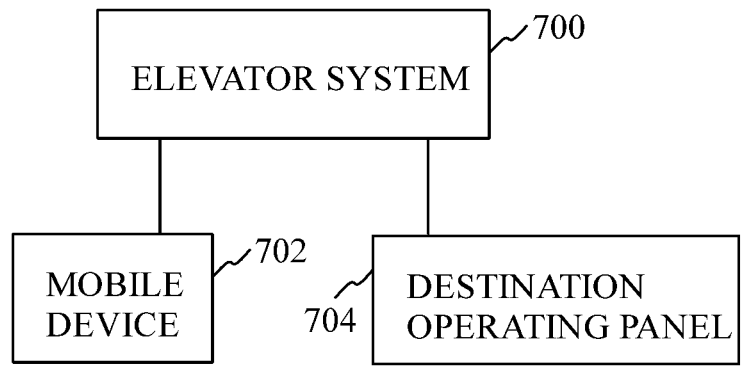
FIG. 7A illustrates an example of a system where mobile device is able to initiate a destination call.

FIG. 7A illustrates an example of a system where a mobile device 702 is able to initiate a destination call. The system comprises an elevator system 700 that controls a plurality of elevators and uses destination call control to operate the elevators. The mobile device 702 described already in more detail in the above examples may be connected to the elevator system 700 and the mobile device 702 places destination calls to the elevator system 700. A destination call may be made also using a destination operating panel 704 arranged in each floor in a building comprising the elevator system 700.

Figure 7B:
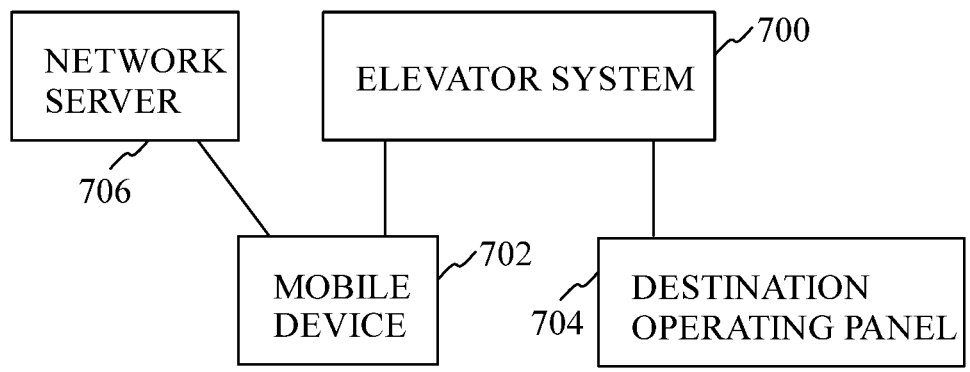
FIG. 7B illustrates another example of a system where mobile device is able to initiate a destination call.

FIG. 7B illustrates another example of a system where the mobile device 702 is able to initiate a destination call. The system in FIG. 7B differs from the system in FIG. 7A in that the system of FIG. 7B further comprises a network server 706. As illustrated in FIG. 6, the network server 706 may store destination call history entries and perform the necessary processing in order to predict a source or a source and a destination floor. When the mobile device 702 places a destination call, the elevator system 702 may receive the destination call from the mobile device 702. In another example, when the source and destination floors have been determined, the destination call may be placed with the network server 706. In other words, the mobile device 702 may not be directly connected to the elevator system 700.

The exemplary embodiments of the invention can be included within any suitable device, for example, including mobile devices, smart phones, tablet computers, servers, workstations, personal computers, laptop computers, capable of performing the processes of the exemplary embodiments. The exemplary embodiments may also store information relating to various processes described herein.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method for predicting floor information for a destination call, the method comprising:
storing, in a memory, destination call history entries about destination calls made by a user, each destination call history entry comprising a time stamp and a source and destination floor pair for a destination call;
associating each destination call history entry with a time slot corresponding to the time stamp of the destination call;
detecting an intention of the user to make a new destination call based on the user either launching an application or browser interface; and
selecting a source and destination floor pair from the source and destination floor pairs associated in the destination call history entries multiple times for a determined time slot as a predicted destination floor and/or a source floor for the new destination call based on the current time and the stored destination call history entries of the user.

2. A method of claim 1, wherein predicting the destination floor for the new destination call comprises:
determining the time slot corresponding to the current time; and
determining which source and destination floor pairs are associated in the destination call history entries multiple times for the determined time slot.

3. A method of claim 2, comprising:
selecting a destination floor from the selected source and destination floor pairs associated in the destination call history entries multiple times for the determined time slot as the predicted destination floor.

4. A method of claim 3, comprising
selecting the destination floor having the highest occurrence number in the determined time slot.

5. A method of claim 1, comprising:
selecting the source and destination floor pair having the highest occurrence number in the determined time slot.

6. A method of claim 1, comprising:
detecting the source floor in response to detecting an intention to make a new destination call; and
using the detected source floor as the predicted source floor.

7. A method of claim 1, wherein detecting an intention to make a new destination call with comprises receiving, from a mobile device, a message indicating the intention to make the new destination call with the mobile device; and wherein the method further comprises:
causing transmission of the predicted destination floor or the predicted source floor and the destination floor to the mobile device.

8. An apparatus for predicting floor information for a destination call, the apparatus comprising:
a memory;
means for storing destination call history entries about destination calls made by a user to the memory, each destination call history entry comprising a time stamp and a source and destination floor pair for a destination call;
means for associating each destination call history entry with a time slot corresponding to the time stamp of the destination call;
means for detecting an intention of the user to make a new destination call based on the user either launching an application or browser interface; and
means for predicting a destination floor and/or a source floor for the new destination call based on the current time and the stored destination call history entries of the user,
wherein the predicting means is configured to select a source and destination floor pair from source and destination floor pairs associated in the destination call history entries multiple times for a determined time slot as the predicted source and destination floor.

9. An apparatus of claim 8, wherein the means for predicting the destination floor for the new destination call are configured to:
determine the time slot corresponding to the current time; and
determine which source and destination floor pairs are associated in the destination call history entries multiple times for the determined time slot.

10. An apparatus of claim 9, comprising:
means for selecting a destination floor from the source and destination floor pairs associated in the destination call history entries multiple times for the determined time slot as the predicted destination floor.

11. An apparatus of claim 10, wherein the means for selecting are configured to select the destination floor having the highest occurrence number in the determined time slot.

12. An apparatus of claim 8, wherein the means for selecting are configured to select the source and destination floor pair having the highest occurrence number in the determined time slot.

13. An apparatus of claim 8, comprising:
means for detecting the source floor in response to detecting an intention to make a new destination call; and
means for using the detected source floor as the predicted source floor.

14. An apparatus of claim 8, wherein the means for detecting are configured to receive, from a mobile device, a message indicating the intention to make the new destination call with the mobile device; and wherein the apparatus further comprises:
means for causing transmission of the predicted destination floor or the predicted source floor and the destination floor to the mobile device.

15. An apparatus of claim 8, wherein the apparatus is one of a mobile device, a network server, or an elevator system control entity.

16. A non-transitory computer readable medium having stored there on a computer program comprising program code, which when executed by a processor, performs the method of claim 1.

* * * * *